United States Patent [19]
Delmastro et al.

[11] Patent Number: 4,466,646
[45] Date of Patent: Aug. 21, 1984

[54] ENERGY ABSORBING BUMPER ASSEMBLY FOR VEHICLES

[75] Inventors: John A. Delmastro, Romeo, Mich.; Paul D. Van Duyn, Anderson, Ind.

[73] Assignee: General Motors Corporation, Detroit, Mich.

[21] Appl. No.: 469,646

[22] Filed: Feb. 25, 1983

[51] Int. Cl.³ .............................................. B60R 19/08
[52] U.S. Cl. .................................... 293/117; 293/120; 293/132; 293/135; 293/138; 362/82
[58] Field of Search ............... 293/117, 120, 132, 135, 293/136, 131, 138; 362/82

[56] References Cited

U.S. PATENT DOCUMENTS

| | | | |
|---|---|---|---|
| 3,866,963 | 2/1975 | Weller | 293/120 |
| 3,884,516 | 5/1975 | Gallion | 293/120 |
| 3,938,841 | 2/1976 | Glance | 293/120 |
| 4,106,804 | 8/1978 | Scrivo | 293/121 |
| 4,213,644 | 7/1980 | Scrivo | 293/117 |
| 4,270,787 | 6/1981 | Savell | 293/136 |
| 4,387,920 | 6/1983 | Slaughter | 293/117 |

Primary Examiner—Robert R. Song
Attorney, Agent, or Firm—Charles R. White

[57] ABSTRACT

This bumper assembly forms a streamlined end of a vehicle and incorporates a channeled inner spring bumper which supports a cellular energy absorber unit and displaceable lamp assemblies. The lamp assemblies are displaced to a protected position within the inner bumper as the energy absorber unit and the inner spring bumper operate to dissipate impact energy.

5 Claims, 5 Drawing Figures

ENERGY ABSORBING BUMPER ASSEMBLY FOR VEHICLES

This invention relates to a new and improved resilient vehicle energy absorbing bumper assembly featuring an impact bar that has deflection capability to absorb impact loads and that provides support for resilient energy absorbing media and protected accommodation for movable lamp assemblies displaceable by impact loads from an operating position within the energy absorbing media to an out-of-way position within the impact bar.

The energy absorbing bumper assembly of the present invention provides a streamlined end of a vehicle and incorporates a new and improved resilient impact bar formed from nested shells of fiberglass or other suitable material supported in recessed position within one end of the vehicle body. Resilient energy absorbing media, preferably in the form of an open celled unit, is mounted within the impact bar and extends outwardly therefrom beyond the vehicle body work to provide impact protection for the vehicle. This media peripherally surrounds and protects parking and signal lamp assemblies which are hinged at one end of the impact bar assembly and which are releasably held at their inner ends to support bracketry secured to the impact bar. A formed flexible plastic fascia covers the media and is attached to support components of the vehicle to streamline the end of the vehicle for reduced resistance to air flow and to present a finely finished appearance.

Impact loads directed to predetermined positions on the bumper assembly will deflect portions of the resilient energy absorbing media and swing the lamp assemblies to a protected out-of-way position so that they will not be damaged as a result of the impact. In this invention, special brackets effectively mount the lamp assembly to the impact bar and provide releasable latches for the inner ends of the swingable lamp assemblies which are hinged at their outer ends to outboard portions of the impact bar. After impact, a spring component of the latch biases the lamp assembly back to its operating position.

It is a feature, object and advantage of this invention to provide a new and improved lightweight vehicle bumper assembly having effective mounting and protection for lamps such as the parking and turn signal lamp assemblies and which mounts energy absorbing media and a covering fascia that mates with the vehicle body work and provides a streamlined and finely finished appearance for the vehicle.

It is a feature, object and advantage of this invention to provide a new and improved bumper assembly for a vehicle incorporating a channeled impact bar of fiberglass or other suitable material preferably formed by shell members which provide an inner spring bumper that deflects on a predetermined load to cushion impact.

Another feature, object and advantage of this invention is to provide a new and improved inner impact bar to form a mounting for resilient energy absorbing media and to house a lamp assembly swingable from a stabilized operating position to an inner retracted and protected position in response to impact load being applied to predetermined portions of the bumper. On removal of the load a return spring moves the lamp assembly to the stabilized operating position.

Another feature, object and advantage of this invention is to provide a new and improved impact bar for mounting an energy absorbing bumper and to further provide improved mounting for a movable lamp assembly having a hinged outer end and a latched inner end which is effectively connected to the impact bar and which is displaceable without damage from securement with the impact bar in response to predetermined impact loads being applied thereto.

These and other features, objects and advantages of this invention will be more apparent from the following detailed decription and drawing in which.

Figure 1:
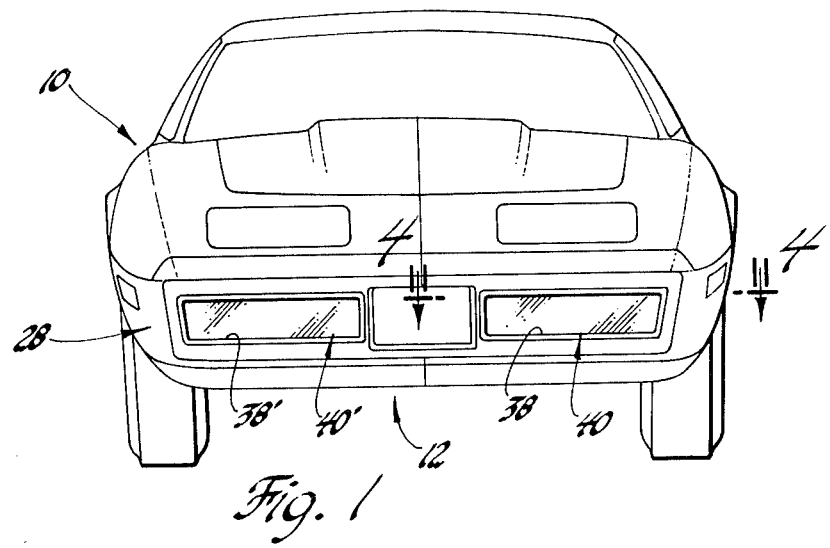
FIG. 1 is a front elevation of a vehicle incorporating the bumper and lamp assembly of this invention.

Referring in greater detail to the drawing, there is illustrated a motor vehicle 10 having a resilient energy absorbing bumper assembly 12 extending laterally across the front end thereof to provide impact protection to the vehicle body work, lamps and other vehicle components. The bumper assembly is supported by a laterally extending frame member 14 which is attached to the forward ends of the longitudinally extending side rails 16, 18 of the vehicle frame. The bumper assembly generally comprises a channeled, lightweight impact bar assembly 20 formed from inner and outer shells 22, 24 (FIGS. 2, 4 and 5) of fiberglass or other suitable non-rusting materials bonded together. As will be further described below the impact bar is resilient and deflects as a spring bumper under certain load conditions to protect the vehicle. The bumper assembly also includes a resilient open celled energy absorbing unit 26 operatively mounted within the impact bar assembly and extending outwardly therefrom to a location beyond the vehicle body work. A shell-like fascia 28 of the bumper assembly is formed from a suitable, pliable plastic material which covers the energy absorber unit and presents a smooth streamlined exterior for the front end of the vehicle to reduce wind resistance and improve vehicle economy. The fascia is supported topside by center and side reinforcements 30, 32 and 34 and is also attached at its flanged underside by reinforcement brackets and threaded fasteners 36 to the impact bar assembly. The fascia has front openings 38, 38' for the park and signal lamp assemblies 40, 40' and openings 42, 42' for the cornering lamp assemblies such as lamp assembly 43.

The impact bar assembly 20 supports the park and signal lamp assemblies 40, 40° for swinging movement on frontal impact between an operating position in which the lamp assemblies are disposed within generally rectangular openings 44, 44' in the energy absorber unit 26 and an inner and protected position within the confines of the shell of the impact bar assembly 20 to effectively eliminate or sharply reduce breakage of the lamp assemblies from predetermined impacts.

Figure 2:
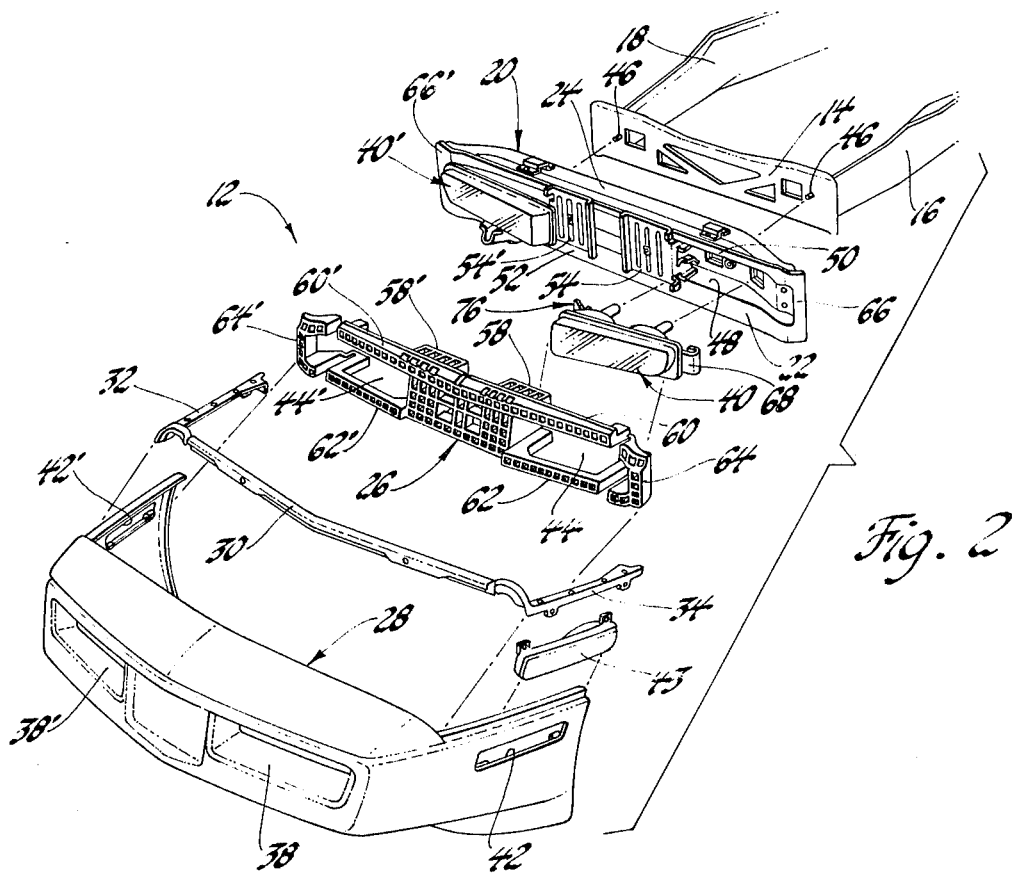
FIG. 2 is an exploded view of the bumper and lamp assembly of FIG. 1.
Figure 4:
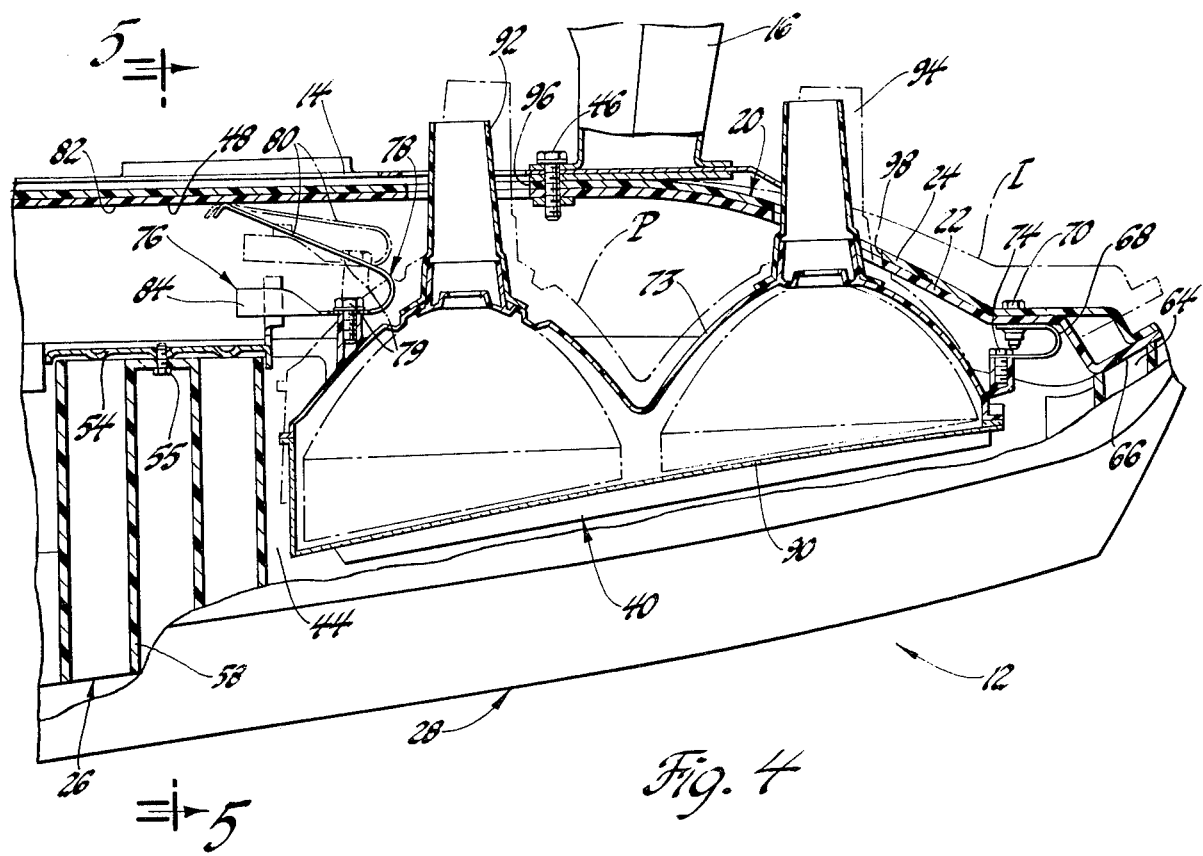
FIG. 4 is a cross sectional view of the bumper and lamp assembly of this invention taken generally along lines 4—4 of FIG. 1.
Figure 5:
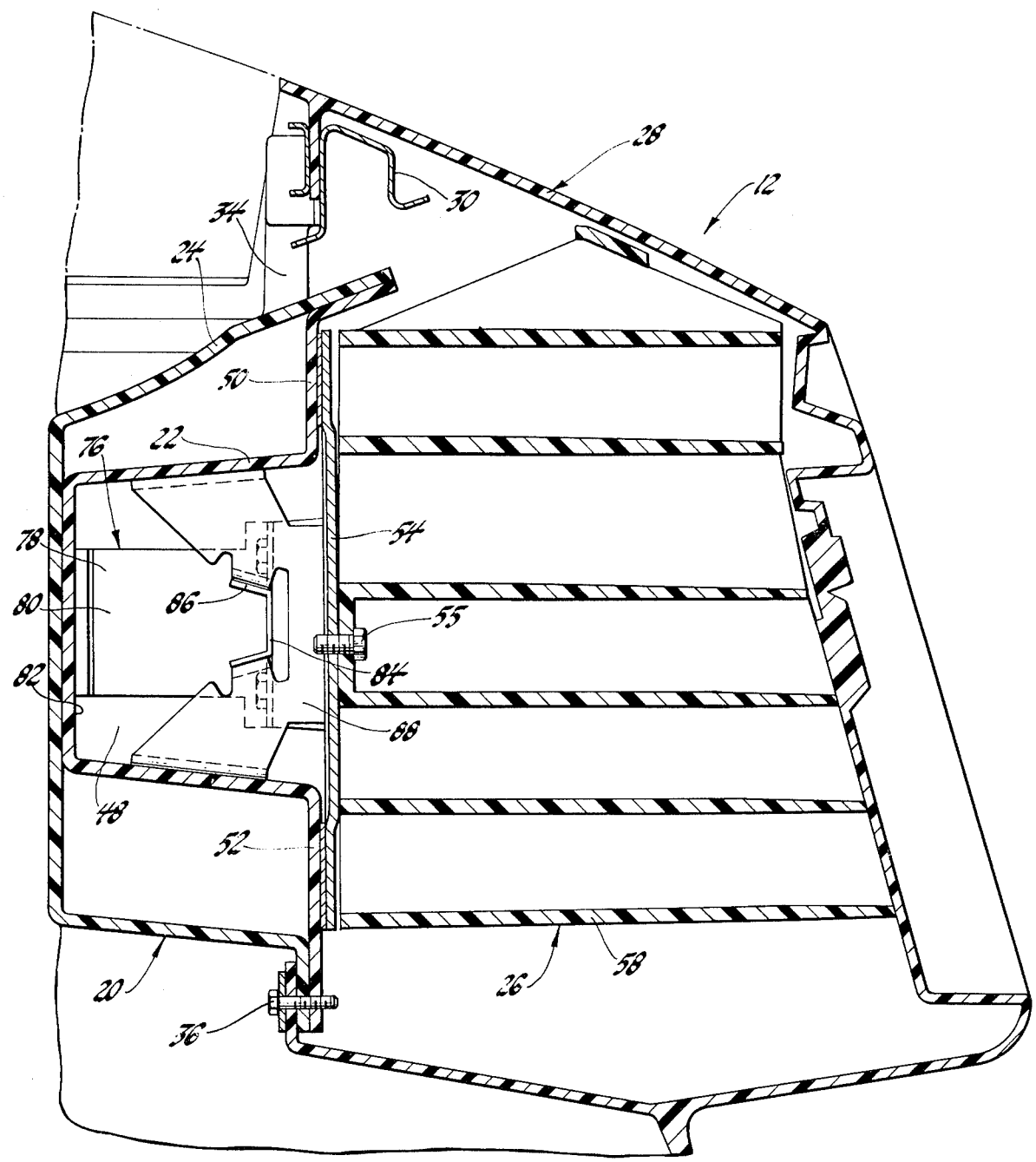
FIG. 5 is a cross sectional view taken generally along lines 5—5 of FIG. 4.

FIGS. 2, 4 and 5 show the impact bar assembly in the greatest detail. The outer shell 24 is an elongated, relatively thin walled channel member of reinforced polyester fiberglass in which the inner shell 22 is nested. The thin-walled inner shell is preferably made of the same reinforced fiberglass and is bonded to the outer shell to form the lightweight bar assembly that can be subsequently secured to the frame member 14 by threaded fasteners 46. The inner shell has central pocket 48 extending across the length of the impact bar assembly to accommodate the lamp assemblies 40, 40' in their displaced position and presents upper and lower vertical flanges 50, 52 to provide support surfaces for generally rectangular support brackets 54, 54' which are preferably plates of aluminum that are bonded at the predetermined positions to the vertical flanges. These brackets are suitably ribbed to increase their strength to support the cellular energy absorber unit 26 which is injection molded from a blended olefin material into a matrix of rectilinear, longitudinally extending cells, the majority of which are open at both ends. Selected cells, however, have closed inner ends so that rivets or threaded fasteners 55 can be employed to secure the energy absorber unit to support brackets 54, 54' and other support structure.

The cellular energy absorber unit has large, generally rectilinear centralized box sections 58, 58' with relatively deep cells that deflect to absorb the high energy level of a frontal impact such as a five mile per hour frontal impact. Since the energy absorber has memory it gradually recovers to its original position without being materially damaged by the impact load.

From the centralized energy absorbing box sections the energy absorbing unit has laterally extending upper and lower cellular wing members 60, 62 and 60', 62' spaced from each other to frame the associated lamp assemblies 40, 40'. Cellular box-like end sections 64, 64' connected by live hinges to the ends of the wing members define the lateral extent of the lamp openings 44, 44' and seat against the rearwardly inclined end portions 66, 66' of the impact bar assembly 20. The end sections 64, 64' distribute loads directed onto the end portions 66, 66' to prevent localized damage to impact bar 20.

Figure 3:
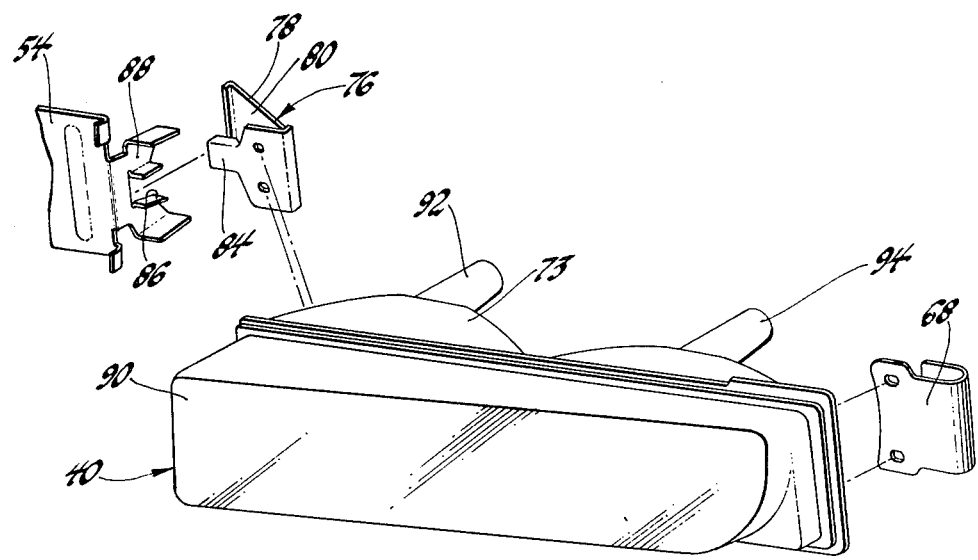
FIG. 3 is an exploded view of the lamp assembly of FIG. 1 illustrating the bracketry and hinge mounting of the lamp assembly.

FIGS. 2, 3 and 4 show the lamp assembly 40 mounted at its outer end by a U-shaped spring hinge member 68 which has one leg secured to the bumper assembly by threaded fasteners 70 and the other leg secured to the housing 73 of the lamp assembly 40 by threaded fasteners 74. Hinge member 68 supports the outer end of the lamp assembly and permits the lamp assembly to swing from its illustrated operating position to a protected phantom line position P within the confines of the impact bar assembly in response to predetermined impacts. The inboard end of the lamp assembly is releasably supported by a special latching mechanism 76 which comprises a spring and latch member 78 generally U-shaped in plan view, attached to housing 73 by threaded fasteners 79. The spring and latch member 78 has a spring leg 80, the free end of which abuts against the inner wall 82 of the impact bar assembly to yieldably urge the lamp assembly outwardly for turning movement about the hinge member 68. The other end of the spring and latch member has a latching head 84 that is biased by the spring leg 80 into close releasable fit in a recess 86 formed by the jaws of a keeper 88. The keeper 88 is integral with and generally extends at right angles to the support bracket 54.

The front of the lamp assembly 40 is closed by an acrylic plastic lens 90 plastic welded to the front of lamp housing 73. The rear of the lamp assembly is fitted with tubular plastic extensions 92, 94 which extend through openings 96, 98 in the rear of the impact bar assembly to provide conduits for the electrical wiring leading to the lamp filaments or bulbs, not illustrated. The lamp assembly 40' and its releasable mounting to the impact bar assembly and operation is the same as described in connection with lamp assembly 40.

Energy from corner impacts to an energy absorbing end section such as section 64 of the bumper assembly may be absorbed by the twisting and deflection of the cells of that member. In the event that cell deformation does not absorb all of the impact energy, impact force will be transmitted to the end portion 66 of the impact bar causing it to deflect to the phantom line position I shown in FIG. 4. Under such conditions energy is stored in the deflected bar and is not transmitted into the vehicle frame and the body work and other vehicle components are thereby protected. Furthermore the latch member 78 and the live hinge provided by hinge member 68 will permit limited side and compound movement of the lamp assembly so that it will not be damaged by material of the energy absorber unit crowding the lamp assembly on such corner impacts. After the impact load is removed the impact bar and end section recover at predetermined rates to their original positions.

Assuming that there is an impact load applied directly to the front of the vehicle the portions of the fascia contact the flange of the lamp assembly and this will displace the lamp assembly rearwardly to the dotted line position and within the confines of the impact bumper where it will be in a protected out-of-way location so that the lamp assembly is not subjected to physical damage. On removal of the impact load the spring leg 80 will return the lamp assembly back to its original and stabilized operating position.

While a preferred embodiment of the invention has been shown and described to illustrate the invention, other modifications will be apparent to those skilled in the art. Accordingly, the scope of the invention is set forth in the following claims.

The embodiments of the invention in which an exclusive property or privilege is claimed are defined as follows:

1. A bumper for a motor vehicle having an impact bumper support structure, a resilient impact bar assembly comprising inner and outer shells extending laterally across one end of the vehicle, said inner shell being secured within said outer shell, fastener means securing said impact bar assembly to said bumper support structure, energy absorber means seated in said impact bar assembly and extending outwardly therefrom for deflecting in response to impact to absorb impact energy and for transmitting impact energy loads greater than a predetermined load to said impact bar assembly to effect deflection of said impact bar assembly whereby the vehicle is effectively protected from damage from impact loads.

2. A bumper for a motor vehicle having impact bumper support structure therein, a resilient impact bar assembly comprising discrete inner and outer shells extending laterally across one end of the vehicle, said inner shell being nested within the outer shell and being secured thereto to form the assembly, fastener means securing said impact bar assembly to said bumper support structure of the vehicle, cellular energy absorber media means seated in said impact bar assembly operable through deflection to absorb impact energy and for transmitting impact energy loads greater than a predetermined load to said impact bar assembly to effect deflection thereof and provide additional impact protection for the vehicle.

3. An impact bumper and lamp assembly for a motor vehicle having support structure therein, a resilient elongated bumper beam extending transverse of one end of said vehicle operatively mounted on said support structure and deflectable in response to transmittal of predetermined impact loads thereto, an electrically energizable lamp unit having an elongated shell-like housing and a lens closing said housing, hinge means yieldably attaching said lamp unit to said bumper beam in a spaced relation thereto and for limited swinging movement from an outer position to a retracted position so that impact loads transmitted to said lamp assembly will deflect said hinge means and displace said lamp assembly, and energy absorbing media means mounted on said bumper beam and disposed adjacent to said lamp assembly to dissipate impact energy by deflection.

4. An impact bumper and lamp assembly for a motor vehicle comprising support means for supporting said bumper and lamp assembly, a bumper beam extending transverse of one end of said vehicle operatively mounted on said bumper support means, said bumper beam having resilient end positions deflecting in response to predetermined impact loads transmitted thereto, an electrically energizable lamp unit having an elongated shell-like housing and a lens closing said housing, hinge means yieldably attaching said lamp unit to said bumper beam in a spaced relation thereto and for limited swinging movement from an outer operating position to a retracted position so that impact loads transmitted to said lamp assembly will deflect said hinge means and displace said lamp assembly, an energy absorbing media means mounted on said bumper beam and disposed alongside of said lamp assembly to dissipate impact energy by deflection.

5. An impact bumper and lamp assembly for a motor vehicle comprising support means for supporting said bumper and lamp assembly thereto, an elongated bumper beam extending across one end of said vehicle operatively mounted to said bumper support means, an electrically energizable lamp unit having an elongated housing and a lens closing said housing, hinge means operatively connecting one end of said housing to said bumper beam permitting the swinging movement of said lamp unit with respect to an axis provided by said hinge means between forward and retracted positions, spring means interposed between said bumper beam and said lamp unit housing for yieldably positioning said lamp unit at said forward position, and catch means for releasably holding said lamp unit at its forward position and for releasing said lamp unit for movement to said retracted position in response to application of impact load thereto.

* * * * *